Figure 1:
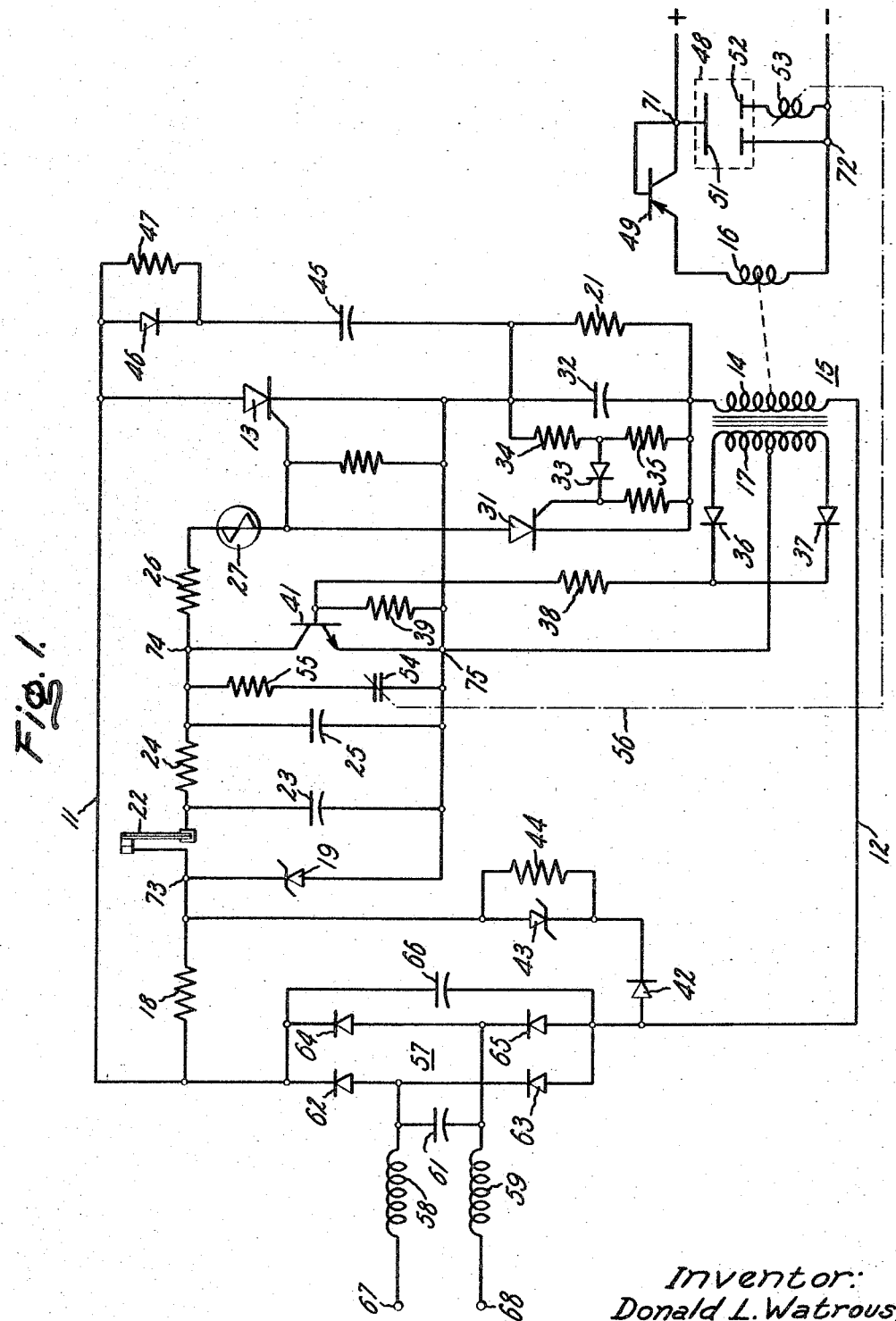

Inventor:
Donald L. Watrous,
by Charles W. Helzer
His Attorney.

United States Patent Office 3,348,118
Patented Oct. 17, 1967

3,348,118
BATTERY CHARGING CIRCUITS
Donald L. Watrous, Scotia, N.Y., assignor to General
Electric Company, a corporation of New York
Filed Sept. 14, 1964, Ser. No. 396,006
5 Claims. (Cl. 320—40)

The present invention relates to new and improved battery charging circuits.

More particularly, the invention relates to a charging circuit for a three-electrode battery which employs a gate turn-off silicon controlled rectifier and transformer connected in the charging current path.

In the use of battery sources of electric energy in industrial, military and space applications, it is often necessary to recharge the batteries from supply sources of electric energy having widely different characteristics. For example, in some applications it may be necessary to recharge the electric battery from a supply source of alternating current electric energy while for other applications the battery must be recharged from a direct current electric energy supply source. In addition, it is possible that the voltage of the available supply sources will vary over a wide range of values, and in the case of alternating current supply sources, the frequency of the alternating current potential may also fluctuate over a wide range of values. Further, because the loading characteristics of a battery changes quite drastically in going from its discharged to its fully charged condition, it follows that the loading characteristics on the charging circuit employed in charging the battery, likewise varies over quite a wide range of values.

It is therefore a primary object of the present invention to provide a new and improved battery charging circuit which is capable of operating efficiently over a wide range of input and load conditions.

Another object of the invention is to provide a new and improved battery charging circuit having the above characteristics which is intended for use primarily with three-electrode batteries.

A feature of the invention is a provision of a battery charging circuit wherein current multiplication is achieved between the current drawn from the supply energy source and the current supplied to the battery being charged, and wherein effective isolation of the input and output voltages is provided.

In practicing the invention, a new and improved charging circuit is provided for charging an energy storage device, such as a battery, to a predetermined energy level. The charging circuit is comprised by a pair of power supply terminals adapted to be connected across a source of electric potential. A conductivity controlled conducting device, such as a gate turn-off silicon controlled rectifier, is operatively connected in series circuit relationship with the primary winding of a transformer having inductively coupled primary and secondary windings, and the series circuit thus comprised is connected across the pair of power supply terminals. Turn-on means are provided for turning on the conductivity controlled conducting device to cause it to conduct, and turn-off means are provided for turning off the conductivity controlled conducting device after a desired interval of conduction. Rectifying means are provided for coupling the secondary winding of the transformer across the energy storage device to be charged, and sensing means are provided for sensing the energy level of the energy storage device. The circuit is sufficiently completed by means operatively interconnecting the output of the sensing means to the turn-on means for rendering the turn-on means inoperative to turn on the conductivity controlled conducting device upon the energy storage device reaching a predetermined energy storage level.

Figure 2:
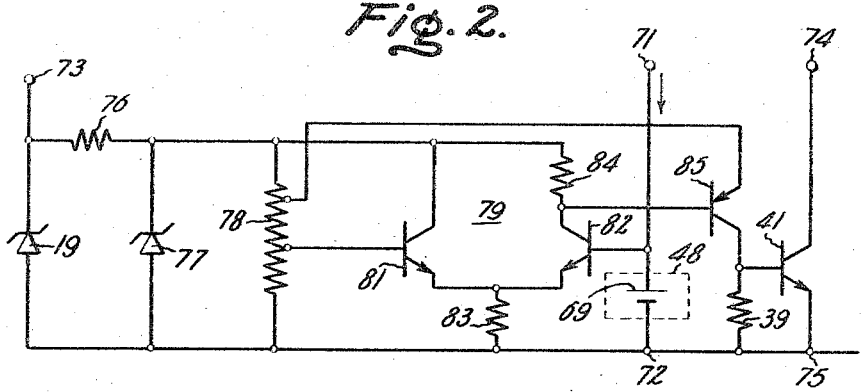
Figure 3:
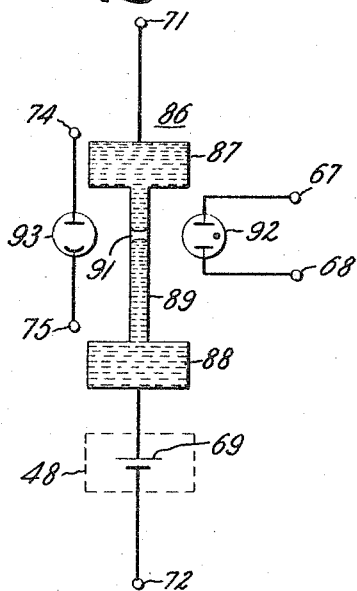

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a schematic circuit diagram of a preferred form of new and improved battery charging circuits constructed in accordance with the invention;

FIGURE 2 is a schematic circuit diagram of an alternative arrangement of the circuit shown in FIGURE 1 wherein the circuit can be adapted for use with two terminal batteries; and FIGURE 3 is a schematic circuit diagram of still another alternative connection for use in the circuit arrangement of FIGURE 1 whereby the circuit can be adapted to charge a battery on an integrated ampere-hour charge basis.

The new and improved battery charging circuit shown in FIGURE 1 of the drawings is comprised in part by a pair of power supply terminals 11 and 12. A conductivity controlled conducting device which is comprised by a gate turn-off silicon controlled rectifier device 13 is operatively connected in series circuit relationship with the primary winding 14 of a two winding transformer 15 having inductively coupled primary and secondary windings 14 and 16, respectively, the series circuit thus comprised being connected across power supply terminals 11 and 12. The gate turn-off silicon controlled rectifier device 13 is a commercially available PNPN semiconductor power device which is manufactured and sold by the Rectifier Components Department of the General Electric Company located in Auburn, N.Y. For a more detailed description of a gate turn-off silicon controlled rectifier device (hereinafter referred to as a GTO) reference is made to chapter 12 of the Silicon Controlled Rectifier Manual, 3rd edition, published and sold by the above-identified Rectifier Components Department of the General Electric Company. The transformer 15 is a conventional wirewound, iron core transformer having an air gap which provides for energy storage and a current step-up between the primary winding 14 and the secondary winding 16. For this reason, the primary winding 14 has a large number of turns relative to the number of turns on the secondary winding 16. In addition, a third winding 17 is provided which is inductively coupled to the primary winding 14. The function of third winding 17 will be described more fully hereinafter.

In order to turn on the GTO 13, turn-on circuit means are provided which include a voltage dividing resistor 18 connected to power supply terminal 11 and a Zener diode 19 of suitable rating which are operatively connected in series circuit relationship through a voltage dropping resistor 21 and primary winding 14 across the power supply terminals 11 and 12. The Zener diode 19 provides a stable reference voltage level that is coupled through a thermostatically operated switch 22 to a first charging capacitor 23 so as to effectively couple capacitor 23 in parallel circuit relationship across Zener diode 19. A resistance-capacitance charging network comprised by a resistor 24 and series connected capacitor 25 is connected in parallel circuit relationship with the first charging capacitor 23. The voltage appearing across the capacitor 25 is coupled through a dropping resistor 26 and snap switch device 27 to the control gate of GTO 13. The snap switch device 27 may comprise any snap action switch device such as a PNPN voltage controlled diac device manufactured and sold by the Rectifier Components Department of the General Electric Company.

This device may also comprise what is known in the art as a Shockley diode or any other similar device. These devices are voltage operated at some predetermined threshold voltage to be rendered conductive and present essentially zero impedance to the flow of gating current therethrough, and upon the current through the device returning below its holding current value, the device will reassume its non-conducting, blocking condition. With this arrangement, it can be appreciated therefore that, upon the voltage across the capacitor 25 reaching a predetermined firing level, the snap action switch device 27 will be rendered conductive and will apply a gating signal to the control gate of GTO 13 thereby causing the GTO 13 to be turned on. Upon GTO 13 being turned on, load current flow through the primary winding 14 will take place.

In order to turn off the GTO 13 after it has once been rendered conductive, turn-off circuit means are provided. The turn-off circuit means is comprised by an auxiliary silicon controlled rectifier device 31 operatively connected between the gating electrode and the emitter electrode of the GTO 13 by means of a commutating capacitor 32 which is connected in series circuit relationship between the GTO 13 and the primary winding 14 of transformer 15. The control gate of the auxiliary SCR 31 is connected through a blocking diode 33 to a pair of voltage dividing resistors 34 and 35 connected in parallel circuit relationship with the voltage limiting resistor 21. By this arrangement, when the load current flow through GTO 13 reaches a predetermined value, a sufficient gating potential will be developed across the limiting resistor 21 which is applied through voltage dividing resistors 34 and 35 and blocking diode 33 to the control gate of the auxiliary SCR 31 to turn on SCR 31. Upon SCR 31 being turned on, the control gate of the GTO 13 will be clamped directly to the negative polarity potential appearing across the capacitor 32, and will cause the GTO 13 to be turned off.

In order to assure that a gating on potential is supplied to the control gate of the GTO 13 only at the initiation of a new cycle of operation, lock out circuit means are provided. The lock out circuit means is comprised by the third winding 17 which is inductively coupled to primary winding 14 of transformer 15, and a pair of rectifying diodes 36 and 37 connected across a pair of load resistors 38 and 39 to the base of an NPN junction transistor 41. The NPN junction transistor 41 has its emitter-collector connected in parallel circuit relationship with the capacitor 25 of the resistor-capacitor charging network included in the turn-on circuit means so as to act as a clamp on the capacitor 25. It can be appreciated therefore that while current is either building up or decaying in primary winding 14, a potential is developed across the third winding 17 which is rectified by diodes 36 and 37. This rectified output voltage will then turn on NPN junction transistor 41, and clamp the potential across the capacitor 25 to a zero value. Hence, the turn-on circuit means cannot function to apply a turning on potential to the control gate of GTO 13 for as long as current is charging in the primary winding 14.

In addition to the lock-out circuit means, the turn-off circuit means also includes a holding circuit means comprised by the primary winding 14, a coupling diode 42, a Zener diode 43 and parallel connected by-pass resistor 44, the Zener diode 19 and voltage dividing resistor 21. The closed series circuit loop comprised by these elements will be actuated as the GTO 13 starts to turn off to supply a circulating current through the voltage dividing resistor 21 that will develop a holding potential. This holding potential is applied through coupling diode 33 to the control gate of auxiliary SCR 31 to hold this SCR on thereby assuring that the GTO 13 will be allowed to return to its nonconducting blocking condition.

In order to facilitate turn-off of the GTO 13, current diverting circuit means are provided which is comprised by a capacitor 45 connected in series circuit relationship with a charging diode 46 and parallel connected by-pass resistor 47 across the load terminals of the GTO 13. By this arrangement, the capacitor 45 will be initially charged through diode 46 to essentially the potential of the power supply terminals 11 and 12 with the circuit in its quiescent condition. Upon GTO 13 being turned on, capacitor 45 will discharge through resistor 47 into GTO 13 to assure that initial current flow through the GTO 13 will be of a sufficient value to hold the GTO 13 on in its conducting condition. This may be required due to the fact that the initial charging current flow through the primary winding 14 may be so low that it would not be sufficient to hold on the GTO 13. While the GTO 13 is conducting, capacitor 45 will be maintained in its discharged condition. Hence, upon the GTO 13 being turned off by auxiliary SCR 31 and capacitor 32, the load current previously flowing through GTO 13 will be diverted to capacitor 45 almost instantaneously thereby facilitating turn-off of GTO 13. Additionally, the build up of voltage across capacitor 45 serves to control the rate of change of re-applied voltage across the GTO 13 as it is turned off thereby further assuring that it will be maintained in its off or blocking condition.

Load current rectifying means are provide for coupling the secondary 16 of transformer 15 across the energy storage device 48 to be charged. In the particular arrangement shown, the load current rectifying means comprises a PNP junction transistor 49 having its base electrode connected directly to its collector electrode, and the energy storage device 48 comprises a three-electrode nickel-cadmium battery 51 having its load terminals connected across the series connected secondary winding 16 and emitter-collector of transistor 49. The PNP junction transistor 49 preferably comprises a junction transistor which has a very low forward resistance when connected in the manner shown to operate as a rectifier. If desired, a diode could be employed in place of the PNP junction transistor 49; however, for the particular application described, the arrangement shown is preferred. Also, if desired, the base of the PNP transistor 49 could be positively driven so as to turn on the transistor to cause it to operate in a rectifying manner to thereby further achieve a reduction in the forward resistance of the transistor. Since the manner of connection of the base of PNP transistor 49 to operate in such a fashion is well known in the art, a further description of how the transistor should be connected to function in this manner is believed unnecessary.

As stated previously, in the arrangement shown in FIGURE 1, the particular energy storage device 48 being charged constitutes a three-electrode battery 51. The three-electrode battery 51 includes a third electrode 52 which in its self constitutes a means for sensing the condition of charge of the three-electrode battery. This third electrode 52 is connected through a relay winding 53 back to one load terminal of the secondary winding 16. As a consequence of this connection, the potential sensed by third electrode 52 will drive relay winding 53. Relay winding 53 constitutes the solenoid field winding of a set of solenoid operated contacts 54 which are connected in series circuit relationship with a limiting resistor 55 across the charged capacitor 25 in the turn-on circuit means. This relationship is indicated by the dash dot lines 56. As a consequence of this connection, when the battery 51 is charged to its fully charged condition, the potential appearing on third electrode 52 will cause relay winding 53 to close the contacts 54. Upon the contacts 54 being closed, the potential across the charging capacitor 25 will be clamped to essentially zero volts so that the GTO 13 cannot be turned on by the turn-on circuit means. Hence, it can be appreciated that the relay winding 53 and its associated contacts 54 constitutes a means for operatively intercoupling the output from the sensing electrode 52 to the turn-on circuit means for rendering the turn-on circuit means inoperative to turn on the GTO 13 upon the energy storage device 48 reaching a predetermined energy storage level. In place of the relay winding 53 and its associated contacts 54, it would also be possible to couple the potential sensed by third electrode 52 directly back to drive the base of the PNP junction transistor 41 to thereby clamp the potential of capacitor 25, and prevent further operation of the turn-on circuit means. However, such a connection would destroy effective isolation between the input and the output from the charging circuit, and hence is not preferred. For certain applications, however, such a connection would avoid the need for the relay 53, and might be preferred from a cost standpoint. The manner of making such a connection is believed to be obvious to one skilled in the art, and hence will not be described further.

In order that the new and improved charging circuit can be employed with electric energy sources having widely different characteristics, alternating current-direct current rectifying circuit means shown generally at 57 are provided. The alternating current-direct current rectifying circuit means 57 are operatively connected across the power supply terminals 11 and 12 for supplying direct current electric potential across the power supply terminals 11 and 12. This alternating current-direct current rectifying circuit means 57 is comprised by a radio frequency choke section formed by a pair of inductors 58 and 59 and a capacitor 61. The radio frequency choke section 58 to 61 is connected across the input terminals of a diode rectifier bridge comprised by diodes 62 through 65, and a filter capacitor 66 is connected across the output load terminals of the diode rectifier bridge. With this arrangement, it is possible to connect the two input terminals 67 and 68 to any energy source whether it be direct current or alternating current in nature and still operate the new and improved battery charging circuit. For example, in the case of a direct current energy source, the voltage of the source may vary ten to one, and with such sources the alternating current-direct current rectifying network 57 performs no function except to couple the direct-current voltage directly to power supply terminals 11 and 12 and R.F. filtering. In the case of alternating current, the voltage may vary ten to one with a frequency variation of ten to one. The specific circuit arrangement shown in FIGURE 1 can be used with such widely variant sources, and the circuit will still operate properly. When alternating current voltage is supplied to the input terminals 67 and 68, it is of course rectified by the bridge rectifiers 62 through 65. If the capacitor 66 is not sufficiently large to filter all of the power line ripple, the voltage appearing across the power supply terminals 11 and 12 will vary from zero to the crest value of the power source at double the power source frequency. The particular embodiment of the battery charging circuit shown in FIGURE 1 is designed to operate at several times the frequency of the supply, and hence experiences several cycles of operation during each cycle of the power source. Current will be maintained by the inductance of the primary winding 14 which forces the current through the GTO 13 during intervals of zero supply voltage from the supply energy source. While operating in this manner, the charging circuit will operate until the instantaneous supply source voltage is not sufficient to produce the required threshold value turn-off current for the GTO 13. As the power source voltage passes through zero, the inductance of primary winding 14 will continue to force current through the bridge rectifier 57, the supply voltage source and GTO 13 until the source voltage increases sufficiently in the following half cycle to supply the required turn-off current value. Upon the supply source voltage reaching this value, the charging circuit then begins to operate normally to provide charging current to the energy storage device 48 in the manner described more fully hereinafter.

In operation the output from the rectifier bridge 57 will be a direct current voltage. Upon the application of a DC voltage across power supply terminals 11 and 12, the capacitor 23 is charged to the value of the operating voltage of Zener diode 19 through resistor 18. The voltage appearing across capacitor 23 is applied across the R-C relaxation oscillator circuit comprised by resistor 24, capacitor 25, resistor 26, snap switch device 27, and the gate to cathode diode of GTO 13. When the snap switch device 27, which is a voltage operated device, breaks down and conducts, a current pulse is generated which turns on the GTO 13. Upon GTO 13 being turned on, the current in primary winding 14 rises linearly producing a voltage drop across the resistor 21. When this rising current reaches a threshold value, the auxiliary silicon controlled rectifier device 31 is turned on by a signal applied to its control gate through coupling diode 33. With the auxiliary SCR 31 conducting, the gate of GTO 13 becomes connected to the negative side of the capacitor 32, causing GTO 13 to turn off. During the conducting interval of GTO 13, the primary winding 14 is in effect charged. When GTO 13 is turned off and returned to its blocking condition, the charged inductance of primary winding 14 must discharge, and in discharging its terminal voltage reverses. This allows the diode rectifier comprised by PNP transistor 49 to conduct, and to couple the energy from the primary winding 14 into the energy storage device 48.

During the time that the energy stored in the inductance of the transformer is being discharged in the above-described manner (and hence while energy is being supplied to the battery 51), it is desirable that the clamping action of transistor 41 be maintained in order to prevent the turn-on circuit means from operation. For this purpose, the voltage induced in the third winding 17 is rectified by diode rectifiers 36 and 37 and applied to the base of the NPN transistor 41. This drives transistor 41 into saturation thus continuing to clamp the value of the potential across the capacitor 25 to zero volts and inhibiting further operation of the relaxation oscillator comprising a part of the turn-on circuit means. Upon the inductance becoming fully discharged, this inhibit signal will drop to zero so that the transistor 41 will return to its blocking or non-conducting condition, and allow the charge on capacitor 25 to again rise. This will then allow the turn-on circuit means to again turn on GTO 13 in the above described manner thereby starting a new cycle of operation.

At the time the GTO 13 blocks, the current flowing in the primary winding 14 does not transfer instantaneously to the secondary winding 16. During the interval immediately after GTO 13 blocks while the current is increasing in the secondary winding 16, the primary current flowing in primary winding 14 will be circulated through the closed series loop circuit comprised by diode 42, Zener diode 43, Zener diode 19, and resistor 21. This serves to essentially clamp the potential of the primary winding 14 to the voltage drop of the two Zener diodes and resistor 21, and also serves to develop a holding potential which is supplied back through coupling diode 33 to assure that the SCR 31 remains turned on for as long as necessary. Also during this interval, a small amount of current is fed back through the resistor 44 to maintain the capacitor 23 in a charged condition while the inhibiting transistor 41 is conducting. This is required since the resistor 18 supplies only enough current to capacitor 23 to operate the firing circuit initially when the inhibit transistor 41 is not conducting.

The current diverting circuit means comprised by diode 46, resistor 47 and capacitor 45 serves essentially three functions. When the GTO 13 is initially fired at a low voltage, the anode current will rise slowly due to the inductance of primary winding 14. In order to assure that there will be sufficient current supplied through GTO 13 to exceed its required hold-on current value, the capacitor 45 in discharging through resistor 47 will insure sufficient anode current to maintain the GTO 13 turned on, and in a conducting state. During turn-off, upon the GTO 13 being turned off, the load current which had been flowing through GTO 13 will be supplied through diode 46 to capacitor 45 which thereby in effect serves to divert the load current sufficiently to allow the GTO 13 to reassume its non-conducting blocking condition. Also the diversion of the anode current from the GTO to capacitor 45 further serves to enhance turn-off of the GTO due to the fact that the resistor 47 and capacitor 45 will limit the rate of rise of reapplied voltage across the GTO thereby further insuring that it will be allowed to return to its blocking or nonconducting condition.

During normal operation of the specific charging circuit arrangement shown in FIGURE 1, the relay winding 53 is employed to sense the value of the potential at the third electrode 52. At the end of a charging operation when the battery 51 has become fully charged, the voltage at the third electrode will increase. The relay winding 53 is designed to operate at a particular predesigned value so that upon the battery becoming fully charged, the contacts 54 of relay winding 53 will close thereby clamping the value of the voltage of capacitor 25 to zero volts just as was done with the inhibiting transistor 41. Hence, as long as the relay winding 53 is energized, the charging circuit is inhibited from operating. After the battery 51 becomes somewhat discharged, so that the potential of the third electrode 52 drops below the holding value of relay winding 53, the contacts 54 will be allowed to open so that the charging circuit will re-start, and will operate until the third electrode potential again rises to its fully charged value. This charging cycle will then continue for as long as power is applied to the charging circuit.

In addition to the above features, it should be noted that the charging circuit will be contained in a mounting chassis which might not be adequate for continuous dissipation of internal heat losses developed by the charging circuit within the restrictions of allowable temperature and variable environment requirements. As a result, the thermostatically operated switch 22 has been included, and has been located within the charging circuit in a position such that it will inhibit operation of the charging circuit when excessively high temperatures are encountered. When such temperatures occur, the thermostatically operated switch 22 will open and will remove power to the pulse generator thereby inhibiting further operation of the charging circuit until such time that the temperatures drop to allowable values.

In normal operation, the charging circuit tends to produce a nearly constant output current which will vary only slightly with varying supply voltage values. Operation from a DC voltage will produce about 20% more current than when operating with an AC supply.

FIGURE 2 of the drawings illustrates an alternative arrangement for the charging circuit shown in FIGURE 1 wherein the charging circuit can be employed to charge a two terminal battery shown at 69 in place of the three terminal battery 51 illustrated with the circuit configuration shown in FIGURE 1. In order to employ the charging circuit with a two terminal battery, it is necessary to utilize a somewhat more complex sensing circuit means for sensing the condition of charge of the two terminal batteries 69. For this purpose, the alternative circuit arrangement of FIGURE 2 is employed. In the circuit arrangement in FIGURE 2, the two terminal battery 69 is adapted to be connected between the terminal points 71 and 72 in the circuit arrangement of FIGURE 1, and the terminal points 73, 74, and 75 are connected to the correspondingly marked terminal points in the circuit of FIGURE 1. In the FIGURE 2 circuit, the Zener diode 19 corresponds to the similarly marked element shown in FIGURE 1, and is utilized to provide a reference voltage. This reference voltage is further divided down by a voltage dividing network comprised by a resistor 76 and second Zener diode 77 connected in series circuit relationship across the Zener diode 19. A reference resistor 78 is connected in parallel circuit relationship with the second Zener diode 77, and is used to energize a differential amplifier 79. The differential amplifier 79 is comprised by a pair of NPN junction transistors 81 and 82 wherein the base of the junction transistor 81 is connected to a tap-off point on resistor 78, and the base of transistor 82 is connected to one load terminal of the two terminal battery 69 being charged. The remaining load terminal of the two terminal battery 69 being charged is connected through a voltage limiting resistor 83 to the common connected emitter electrode of the NPN junction transistors 81 and 82. A small load resistor 84 is connected in the collector electrode lead of transistor 82, and the series circuit comprised by resistor 84 and the emitter-collector of transistor 82 is connected in parallel with the emitter-collector of transistor 81 across reference resistor 78. Load resistor 84 is connected also to the base of a PNP junction transistor 85. The PNP junction transistor 85 has its emitter electrode connected back to a second tap-off point on the reference resistor 78, and has its collector electrode connected to the base of the NPN junction transistor 42 which corresponds to the similarly numbered element 41 employed in circuit arrangement of FIGURE 1.

In operation, the differential amplifier 79 serves to compare the potential of the two terminal battery 69 being charged to a reference potential obtained across the reference resistor 78. When the potential of the battery 69 drops below the predetermined reference potential, the transistor 85 will be turned off and maintained in its nonconducting blocking condition so that the clamping transistor 41 likewise is retained in its nonconducting blocking condition. This then allows the charging circuit to operate in the previously described manner to charge battery 69. Upon the two terminal battery 69 attaining its fully charged potential, transistor 82 will turn off raising its collector potential sufficiently so that the transistor 85 will be turned on thereby in turn turning on the clamping transistor 41. Upon clamping transistor 41 being turned on, it will clamp the voltage across the capacitor 25 in the resistor-capacitor charging network of the turn-on circuit means to prevent further operation of the turn-on circuit means to turn on the GTO 13 in the previously described manner. Hence, it can be appreciated that the circuit arrangement in FIGURE 2 will operate to sense the voltage of the two terminal battery 69 being charged by the circuit and cause the turn-on circuit means either to operate to turn on the GTO 13, or will inhibit operation of the turn-on circuit means in the event that the battery is in a fully charged condition.

FIGURE 3 of the drawings illustrates schematically still another form of control for the new and improved charging circuit arrangement shown in FIGURE 1. In the arrangement shown in FIGURE 3, a two terminal battery 69 is again used as an energy storage device to be charged by the charging circuit arrangement. The battery 69 is connected in series circuit relationship with an ampere-hour integrating device 86 with the series circuit thus formed being connected between the two terminal points 71 and 72 which correspond to similarly marked points on the circuit arrangement of FIGURE 1. The ampere-hour charge integrating device 86 constitutes a commercially available ampere-hour charge integrating device which may be obtained on the open market, and is comprised by a pair of mercury pools 87 and 88 separated by a capillary tube portion 89 filled with mercury from each of the tubes and having an air bubble indicated at 91 which separates the two columns of mercury projecting into the capillary tube portion 89. With this arrangement, the electrolyte bubble 91 can be driven from one end of the capillary to the other depending upon the ampere-hours of current flow therethrough, and the direction of the current flow. Hence, when the battery 69 is in a fully charged condition due to a charging current having been supplied thereto from the charging circuit arrangement of FIGURE 1, the bubble 91 will have been driven up to the end of the capillary tube 89 to the position shown. Upon the battery 69 becoming discharged, the flow of the discharging current will have caused the bubble 91 to move down to the bottom of the capillary tube 89 of integrating device 86. When the bubble 91 is located in the upper portion of the capillary tube device 86 in the position shown in FIGURE 3, it is disposed in a position opposite a neon glow tube 92 supplied from power supply terminals 67 and 68, and will allow light from glow tube 92 to pass through the capillary tube portion and fall upon a photoelectric device 93 which may comprise a photosensitive resistor, a photoemissive discharge device, or some other similar light sensitive element whose electrical resistance drops essentially to zero value upon the impingement of light thereon. The photoelectric device 93 is connected across the terminals 74 and 75 of the FIGURE 1 circuit arrangement so that in effect it can also serve to clamp the potential of the charging capacitor 25 in the turn-on circuit means thereby preventing further turn on of GTO 13 to inhibit further operation of the battery charging circuit in the previously described manner.

From the above description, it can be appreciated that when battery 69 is in its fully charged condition, the bubble 91 will be located in a position such that sufficient light from the glow tube 92 falls on photoelectric device 93 to effectively prohibit further operation of the battery charging circuit. Thereafter upon discharge of the battery 69, the bubble 91 will move downward in capillary tube portion 89 to a point such that impinged light is allowed to pass from the glow tube 92 and impinge upon photoelectric device 93. Upon this occurrence, the photoelectric device 93 will assume its nonconducting or high resistance condition so that the inhibiting action of photoelectric device 93 is removed from the turn-on circuit means of the charging circuit. As a consequence, the charging circuit will be allowed to operate to again recharge the battery 69. The amount of movement of the bubble 91 can be calibrated in the number of ampere-hours required for the battery 69 to discharge and be recharged. Charging current flowing through the ampere-hour integrating device will cause a deposition of mercury from mercury pool 87 onto mercury pool 88 and this results in causing the bubble 91 to be moved up to the position shown whereby light will be transmitted from glow tube 92 to photoelectric device 93 with its resulting inhibiting action on the charging circuit. Thereafter, discharge current flowing from the battery 69 will again cause the bubble 91 to move back down in the capillary to a point such that light from the glow tube 92 is cut off from the photoelectric device thereby removing the inhibiting clamp from the charging circuit and allowing a new charging cycle to commence.

While the particular embodiments of the invention disclosed have been described with relation to single cell batteries, it is believed obvious that the circuit can be used equally well to charge multiple cell battery systems. With such multiple cell battery systems, it is merely necessary to provide that the sensing means be arranged so that it can sense the voltage of each cell in the system, and to inhibit further charging upon the voltage of any particular cell reaching dangerously high levels. Since the modifications required to adapt the new and improved charging circuits for use with multiple cell systems are believed to be obvious to one skilled in the art, a further description thereof is deemed necessary.

From the foregoing description, it can be appreciated that the invention makes available a new and improved battery charging circuit which is capable of operating in an efficient manner over a wide range of input and load conditions, and is particularly satisfactory for use with three-electrode batteries. In operation, the new and improved battery charging circuit provides current multiplication between the current drawn from a supply energy source and the charging current supplied to the battery being charged, and at the same time makes possible effective isolation of the input and output voltages of the circuit.

Having described several embodiments of a new and improved battery charging circuit construction in accordance with the invention, it is believed obvious that other modifications and variations of the invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A charging circuit for charging an energy storage device to a predetermined energy level including in combination a pair of power supply terminals adapted to be connected across a source of electric potential, a conductivity controlled conducting device operatively connected in series circuit relationship with the primary winding of a transformer having inductively coupled primary and secondary windings, the series circuit thus comprised being connected across a pair of power supply terminals, turn-on means for turning on said conductivity controlled conducting device to cause it to conduct, turn-off means for turning off said conductivity controlled conducting device after a desired interval of conduction, rectifying means for coupling the secondary winding of the transformer across the energy storage device, sensing means for sensing the energy level of the energy storage device, and means operatively intercoupling the output from such sensing means to said turn-on means for rendering said turn-on means inoperative to turn-on said conductivity controlled conducting device upon said energy storage device reaching a predetermined energy storage level, wherein said conductivity controlled conducting device comprises a gate turn-off silicon controlled rectifier device, and wherein the circuit is further characterized by current diverting circuit means operatively connected in parallel circuit relationship with the gate turn-off silicon controlled rectifier device for supplying a holding current to the device during its initial turn-on, and for diverting current from the device upon its being turned off and returned to its blocking or non-conducting condition.

2. A charging circuit for charging an energy storage device to a predetermined energy level including in combination a pair of power supply terminals adapted to be connected across a source of electric potential, a conductivity controlled conducting device operatively connected in series circuit relationship with the primary winding of a transformer having inductively coupled primary and secondary windings, the series circuit thus comprised being connected across a pair of power supply terminals, turn-on means for turning on said conductivity controlled conducting device to cause it to conduct, turn-off means for turning off said conductivity controlled conducting device after a desired interval of conduction, rectifying means for coupling the secondary winding of the transformer across the energy storage device, sensing means for sensing the energy level of the energy storage device, and means operatively intercoupling the output from such sensing means to said turn-on means for rendering said turn-on means inoperative to turn-on said conductivity controlled conducting device upon said energy storage device reaching a predetermined energy storage level, wherein said conductivity controlled conducting device comprises a gate turn-off silicon controlled rectifier device, and wherein said turn-off means comprises an auxiliary gate control silicon controlled rectifier device operatively connected between the gate and emitter electrodes of the gate turn-off silicon controlled rectifier device, lock out circuit means operatively coupled between the primary winding of said transformer and said turn-on means for locking out operation of said turn-on means during turn-off of the gate turn-off silicon controlled rectifier device, and holding circuit means operatively coupled to the primary winding of said transformer for developing a holding potential that is applied to the control gate of the auxiliary silicon controlled rectifier device for holding the auxiliary device turned on during turn-off of the gate turn-off silicon controlled rectifier device.

3. A charging circuit for charging a three-electrode battery to a predetermined voltage level including in combination a rectifying network adapted to be connected across a source of either direct current or alternating current electric potential for developing across its output terminals a direct current potential, a pair of power supply terminals connected across the output terminals of the rectifying network, a gate turn-off silicon controlled rectifier device operatively connected in series circuit relationship with the primary winding of a two winding transformer having inductively coupled primary and secondary windings, the series circuit thus comprised being connected across the pair of power supply terminals, turn-on circuit means including a resistor-capacitor network and a snap action switch device operatively connected to the control gate of said gate turn-off silicon controlled rectifier device for turning on the device to cause it to conduct, turn-off circuit means including an auxiliary silicon controlled rectifier device operatively connected between the control gate of the gate turn-off silicon controlled rectifier device and a source of negative potential for applying a negative turn-off potential to the control gate of the gate turn-off silicon controlled rectifier device, lock out circuit means operatively coupled to the primary winding of the transformer and including a clamping transistor connected in parallel circuit relationship with the capacitor of the resistor-capacitor charging network in the turn-on circuit means for inhibiting operation of said turn-on circuit means during turn-off of the gate turn-off silicon controlled rectifier device, circuit means including the primary winding of the transformer for developing a holding potential that is applied to the control gate of the auxiliary silicon controlled rectifier device turning turn-off of the gate turn-off silicon controlled rectifier device, current diverting circuit means operatively connected in parallel circuit relationship with the gate turn-off silicon controlled rectifier device for supplying a holding current to the gate turn-off silicon controlled rectifier device during its initial turn-on, and for diverting current from the gate turn-off silicon controlled rectifier device during its turn-off, rectifying means for coupling the secondary winding of the transformer across a three-electrode battery to be charged, voltage sensing means for sensing the voltage at the third electrode of a three-electrode battery being charged, said voltage sensing means including a relay winding, and circuit means including the relay contacts of said last mentioned relay winding operatively connected in parallel circuit relationship with the charging capacitor charging network in the turn-on circuit means for inhibiting further operation of said turn-on means to prevent it from turning on said gate turn-on silicon controlled rectifier device upon the voltage level of the third electrode of a three-electrode battery being charged reaching a predetermined voltage level.

4. The circuit combination set forth in claim 3 further characterized by a thermally operated switch operatively connected in the turn-on circuit means for open circuiting the turn-on circuit means when the operating temperature of the circuit reaches an excessively high temperature thereby rendering the charging circuit inoperative.

5. A charging circuit for charging a battery to a predetermined voltage level including in combination a rectifying network adapted to be connected across a source of either direct current or alternating current electric potential for developing across its output terminals a direct current potential, a solid state conductivity controlled conducting device operatively connected in series circuit relationship with the primary winding of a transformer having inductively coupled primary and secondary windings, the series circuit thus comprised being connected across the output terminals of the rectifying network, turn-on means for turning on said conductivity controlled device to cause it to conduct and store energy in said primary transformer winding, turn-off means for turning off said conductivity controlled device after a desired interval of conduction so that the energy stored in said primary winding is discharged into the secondary winding of said transformer, said turn-on means and turn-off means operating sequentially and cyclically over a plurality of cycles to alternately charge and discharge said transformer windings, rectifying means for coupling the secondary winding across the battery, said rectifying means being rendered conductive only upon discharge of the energy stored in the primary winding of the transformer during each of the cycles to achieve charging of the battery, sensing means for sensing the voltage level of the battery and means operatively intercoupling the output from such sensing means to said turn-on means for rendering said turn-on means inoperative to turn-on said conductivity controlled conducting device upon said battery reaching a predetermined voltage level.

References Cited

UNITED STATES PATENTS

| | | | |
|---|---|---|---|
| 3,160,805 | 12/1964 | Lawson | 320—39 |
| 3,178,629 | 4/1965 | Saslow | 320—23 |
| 3,179,871 | 4/1965 | Bagno | 320—30 |
| 3,271,700 | 9/1966 | Gutzmiller | 332—14 |

JOHN F. COUCH, *Primary Examiner.*

S. WEINBERG, *Assistant Examiner.*